US008706142B1

(12) United States Patent
Mishra

(10) Patent No.: US 8,706,142 B1
(45) Date of Patent: Apr. 22, 2014

(54) PROBABILISTIC ESTIMATION OF LOCATION BASED ON WIRELESS SIGNAL STRENGTH AND PLATFORM PROFILES

(75) Inventor: Arunesh Mishra, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/589,753

(22) Filed: Aug. 20, 2012

Related U.S. Application Data

(60) Provisional application No. 61/525,105, filed on Aug. 18, 2011.

(51) Int. Cl.
*H04W 24/00* (2009.01)

(52) U.S. Cl.
USPC .................. 455/456.3; 455/456.1; 455/456.5

(58) Field of Classification Search
USPC ................................. 455/456.1, 456.5, 456.6
See application file for complete search history.

(56) References Cited

U.S. PATENT DOCUMENTS

| | | | | |
|---|---|---|---|---|
| 5,854,981 | A * | 12/1998 | Wallstedt et al. | 455/439 |
| 6,061,337 | A * | 5/2000 | Light et al. | 370/331 |
| 7,233,799 | B2 * | 6/2007 | Spain, Jr. | 455/456.1 |
| 7,359,718 | B2 * | 4/2008 | Tao et al. | 455/456.5 |
| 7,616,555 | B2 * | 11/2009 | Hart | 370/203 |
| 7,668,123 | B1 * | 2/2010 | Scott et al. | 370/310 |
| 7,697,479 | B2 * | 4/2010 | Metke et al. | 370/331 |
| 8,295,853 | B2 * | 10/2012 | Heikkila et al. | 455/456.1 |
| 8,447,308 | B2 * | 5/2013 | Richter et al. | 455/436 |
| 2003/0069027 | A1 * | 4/2003 | Heinonen et al. | 455/456 |
| 2003/0087646 | A1 * | 5/2003 | Funato et al. | 455/456 |
| 2003/0129992 | A1 * | 7/2003 | Koorapaty et al. | 455/456 |
| 2005/0040968 | A1 * | 2/2005 | Damarla et al. | 340/825.49 |
| 2005/0105600 | A1 * | 5/2005 | Culum et al. | 375/150 |
| 2005/0258957 | A1 * | 11/2005 | Krumm et al. | 340/539.13 |
| 2006/0087425 | A1 * | 4/2006 | Haeberlen et al. | 340/539.13 |
| 2008/0299995 | A1 * | 12/2008 | Spain | 455/456.6 |
| 2010/0120422 | A1 * | 5/2010 | Cheung et al. | 455/434 |
| 2010/0255856 | A1 * | 10/2010 | Kansal et al. | 455/456.1 |

OTHER PUBLICATIONS

Office Action mailed Jul. 18, 2013, in U.S. Appl. No. 13/589,739, Mishra, A., filed Aug. 20, 2012.

* cited by examiner

*Primary Examiner* — Charles Shedrick
(74) *Attorney, Agent, or Firm* — Marshall, Gerstein & Borun LLP

(57) ABSTRACT

According to an embodiment, a method of estimating a location of an access point is provided. The method includes storing a first and a second sample respectively received from a first and a second mobile device, both samples including a location of their respective mobile devices, an access point identifier from the access point, and a value corresponding to a signal strength of a signal from the access point measured at their respective mobile device. A first and second platform profile is selected based on characteristics of the respective first and second mobile devices. The cells of a matrix are populated with probabilities based on mobile device locations, the signal strength values and platform profiles based on platform profiles associated with mobile devices. Finally, the location of the access point is estimated based on the matrix.

18 Claims, 11 Drawing Sheets

PROBABILISTIC ESTIMATION OF LOCATION BASED ON WIRELESS SIGNAL STRENGTH AND PLATFORM PROFILES

CROSS REFERENCE TO RELATED APPLICATIONS

This application claims the benefit of U.S. Provisional Patent Application No. 61/525,105, filed Aug. 18, 2011, entitled "Probabilistic Estimation of Location Based on Wireless Signal Strength and Platform Profiles," which is incorporated herein in its entirety by reference.

FIELD

The field relates to estimating locations. More particularly, it relates to estimating a location based on wireless signals.

BACKGROUND

To dynamically update their location, many mobile wireless devices use on-board global positioning system (GPS) technology. GPS technology can allow a mobile wireless device to accurately calculate its geographical location. However, for those mobile wireless devices that do not have a GPS component or other method of determining geographic location, useful approaches to determine a geographic location may be limited. In addition, even in phones with GPS capability, devices may frequently have their location determination capabilities interrupted by so-called "urban canyons" or other obstructions. GPS location determinations are also subject to errors. Because GPS determinations also consume significant amount of battery, some mobile application developers seek to use it sparingly.

To provide location estimates to mobile devices, it can be useful to know the locations of wireless access points. Estimating the location of mobile devices and wireless access points can be difficult.

BRIEF SUMMARY

Embodiments described herein relate to estimating a location of a wireless access point. According to an embodiment, the method includes storing a first sample received from a first mobile device, the first sample including a first mobile device location, an access point identifier from the access point, and a first value corresponding to a signal strength of a signal from the access point. A first platform profile is selected based on characteristics of the first mobile device. The cells of a matrix are populated with probabilities based on the first mobile device location, the first platform profile and the first value. A second sample received from a second mobile device is stored, the second sample including a second mobile device location, an access point identifier from the access point, and a second value corresponding to a signal strength of a signal from the access point. A second platform profile is selected based on characteristics of the second mobile device. The probabilities in the matrix are updated based on the second mobile device location, the second platform profile and the second value. Finally, the location of the access point is estimated based on the matrix.

Further features and advantages, as well as the structure and operation of various embodiments are described in detail below with reference to the accompanying drawings.

BRIEF DESCRIPTION OF THE FIGURES

Embodiments discussed herein are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

Figure 1:
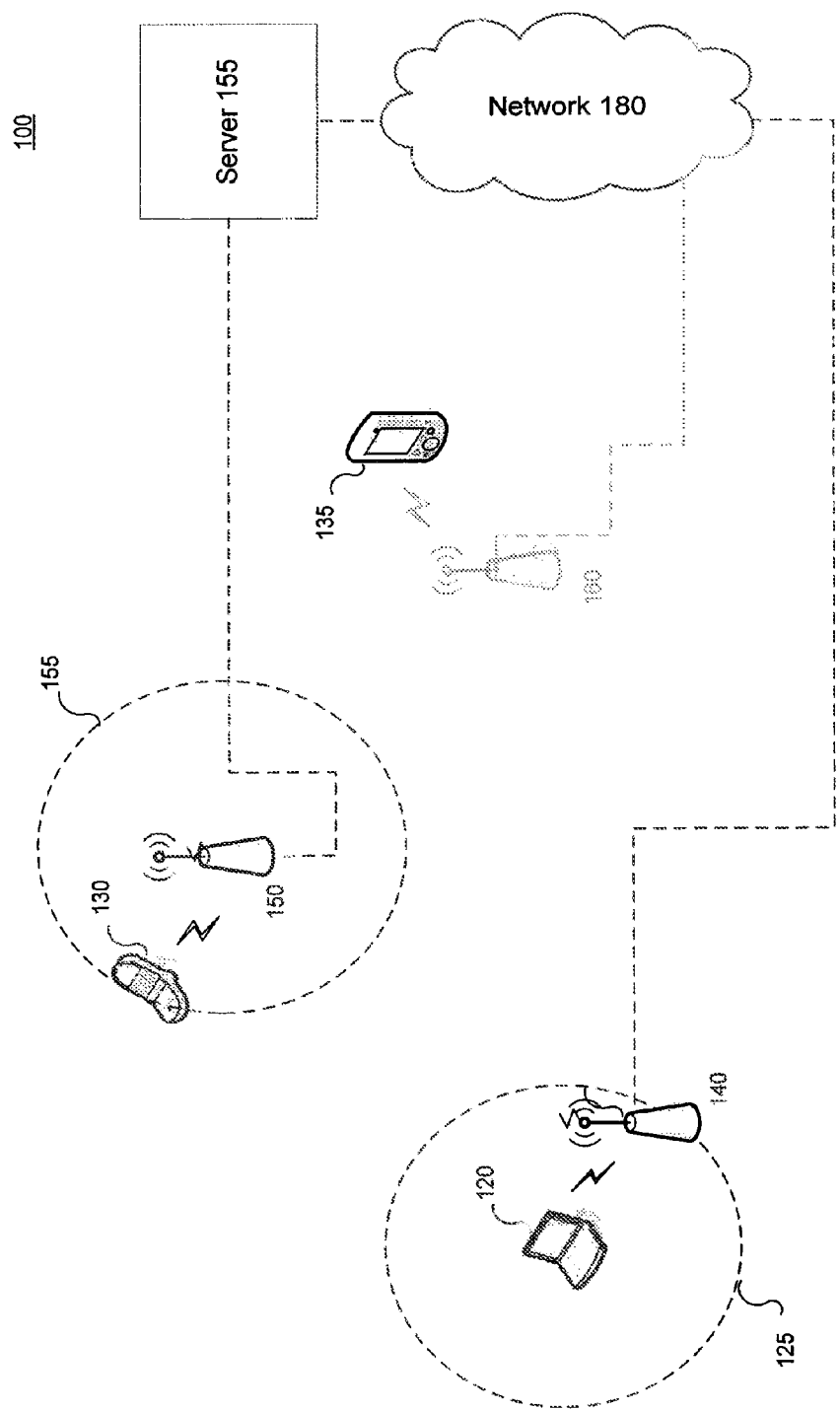
FIG. 1 is an architecture diagram of a system suitable for estimating the location of a wireless access point, according to an embodiment.

The following detailed description refers to the accompanying drawings that illustrate exemplary embodiments. Other embodiments are possible, and modifications may be made to the embodiments within the spirit and scope of the embodiments discussed herein. Therefore, the detailed description is not meant to be limiting of embodiments. Rather, the scope of this application is defined by the appended claims.

Features and advantages are set forth in the description that follows, and in part are apparent from the description, or may be learned by practice of embodiments. The advantages of embodiments are realized and attained by the structure and particularly pointed out in the written description and claims hereof as well as the appended drawings. The following detailed description is exemplary and explanatory and is intended to provide further explanation of embodiments as claimed.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one skilled in the art to effect such feature, structure, or characteristic in connection with other embodiments, whether or not explicitly described.

It would be apparent to one of skill in the relevant art that the embodiments described below can be implemented in many different embodiments of software, hardware, firmware, and/or the entities illustrated in the figures. Any actual software code with the specialized control of hardware to implement embodiments is not limiting of this description.

Thus, the operational behavior of embodiments is described with the understanding that modifications and variations of the embodiments are possible, given the level of detail presented herein.

Overview of Embodiments

An embodiment provides a mechanism that enables a method of estimating a location of a wireless access point. Another embodiment provides a mechanism that enables a method of estimating a location of a mobile device. Some embodiments collect and store sample information from a plurality of sampled mobile devices. These samples include a sampled mobile device location, an access point identifier, and a value corresponding to the signal strength of the signal received from the wireless access point at the sampled mobile device. Having an access point identifier can allow for the lookup of a predetermined location for the access point. Having the locations of both the mobile device and the wireless access point enables a distance between them to be determined. Thus, in an embodiment, stored samples provide a relationship between measured signal strength and distance to an access point.

As described herein, when the stored samples are compared to a signal strength of mobile device with an unknown location, the samples can provide an estimate of the distance of the wireless device from the wireless access point. In an embodiment, this determined distance estimate is stored as a probability distribution function having a wide range of distance values. In an example, different determined probabilities are assigned to distances between 0 and 200 meters. Thus, in an embodiment, the determined estimate is not a single distance value, rather is a determined probability for each of the possible distance values.

As described herein, when the probability function based on the samples is compared to a signal strength of a wireless access point with an unknown location, the function can provide estimate of the distance of a mobile device from the wireless access point.

In a variation of the approach described above, in an embodiment described with the description of FIG. 8 below, a device profile is determined that adjusts the estimated results on an embodiment based on characteristics of the mobile device.

FIG. 1 illustrates a network architecture 100. Network architecture 100 comprises server 155, network 180, various mobile devices 120, 130 and 135 and wireless access points 140, 150 and 160. In an exemplary embodiment, wireless access points use the IEEE 802.11 family of wireless standards (WiFi) to couple to mobile devices 120, 130 and 135. Network architecture 100 can also use different wireless standards, including GSM, TDMA and/or a CDMA technology enabled mobile network, or a combination of wired and wireless networks. Although in the following description, WiFi networks are used as an example, it is to be noted that the description is not limited to WiFi networks. Although three mobile devices and three wireless access points are illustrated for exemplary purposes, network architecture 100 may comprise any number of mobile devices and wireless access points. In an example, each device associated with network architecture 100 may transmit and receive data (packets) according to a known protocol in a segment (channel) of allotted portion the spectrum (frequency band). For instance, the IEEE 802.11 series of protocols specifies the format of various types of packets which may be transmitted in preset channels of the spectrum, such as the ISM band located in the 2.4 GHz frequency range or the public safety band located in the 4.9 GHz frequency range. As would be appreciated by one having skill in the relevant art(s), some embodiments described herein can apply to cellular towers, GPS satellites and many other wireless transceiver systems.

Mobile devices 120, 130 and 135 may include any device that is configured to exchange any form of data over a wireless network. Each mobile device 120, 130 and 135 may communicate with wireless access points 140, 150, 160. Wireless access points 140, 150 and 160 may allow mobile devices 120, 130 and 135 to communicate over network architecture 180 or any other network connected to network 180. It should be noted that, to measure a signal from a wireless access point, a mobile device does not need to be coupled to the access point. Mere measuring of the signal strength from an access point is all that is required from embodiments. Accessing a network, or viewing network "payload" data is not required by embodiments.

In a first example shown on FIG. 1, mobile device 120 is wirelessly coupled to wireless access point 140. In this example, wireless access point 140 has a pre-determined geographic location and the geographic location of mobile device 120 is not known. Dotted line estimate 125 shows the boundary of the estimated location for mobile device 120 before an embodiment is used to estimate the location of the device.

In a second example shown on FIG. 1, mobile device 130 is wirelessly coupled to wireless access point 150. In this example, wireless access point 150 does not have a determined geographic location. The geographic location of mobile device 130 is known to a high level of accuracy based on a GPS fix performed by the device. Dotted line estimate 155 shows the boundary of the estimated location for wireless access point 150 before an embodiment is used to estimate the location of the access point.

In a third example shown on FIG. 1, mobile device 135 is wirelessly coupled to wireless access point 160. In this example, wireless access point 150 has a pre-determined geographic location and the geographic location of mobile device 135 is known to a high level of accuracy based on a GPS fix performed by the device.

The third example is a circumstance where a useful sample can be collected showing a measured signal strength, and the known locations of both mobile device 135 and wireless access point 160 (determined by a lookup from an access point identifier). As discussed below, similar samples can be used by embodiments in the first and second example situations above to estimate the geographic respective locations of mobile device 120 and wireless access point 150.

Figure 2:
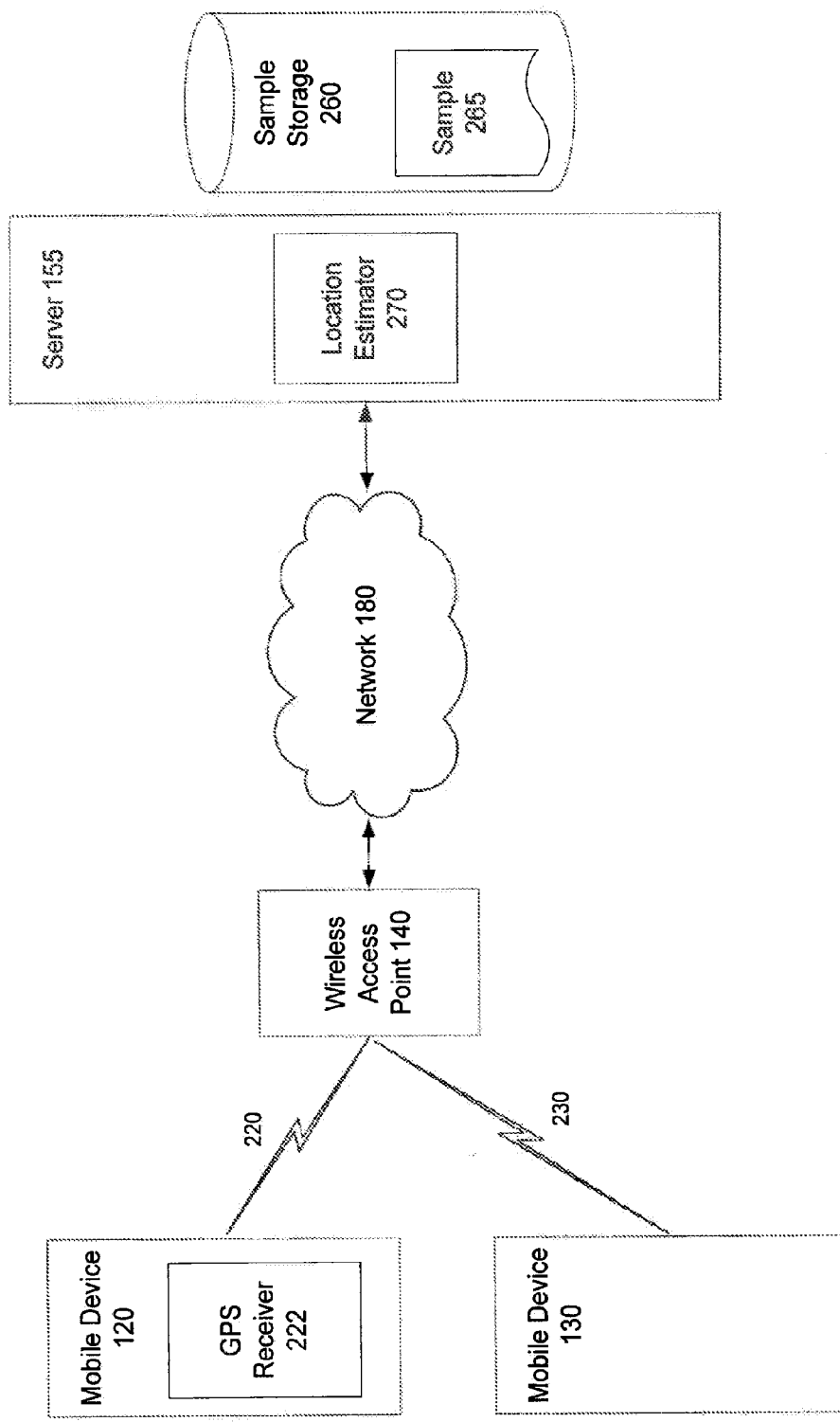
FIG. 2 is a more detailed diagram of the components of the system in FIG. 1, according to an embodiment.

FIG. 2 shows network 200 having mobile devices 120 and 130, wireless access point 140, network 180, server 155 and sample storage 260. Mobile device 120 has GPS receiver 222 and mobile device 130 does not have a GPS receiver. Wireless signals 220 and 230 show the signals received from wireless access point 140 at mobile devices 120 and 130 respectively. Wireless signals 220 and 230 can be measured at mobile devices 120 and 130 to provide data for samples used by embodiments. It is important to note that, in embodiments, the users of mobile devices described herein may opt-out of participating in functions described herein, including the data collection and location determination functions.

In an example, location estimator 270 receives sample 265 from the interaction of mobile device 120 and wireless access point 140. In an embodiment, the received sample 265 includes the geographic location of mobile device 120 determined by GPS receiver 222. The sample also includes a signal strength measured from signal 220. Once received at location estimator 270, sample 265 is stored in sample storage 260.

From sample storage 260, sample 265 can be used by location estimator 270 to determine location estimates by approaches described below.

Figure 3:
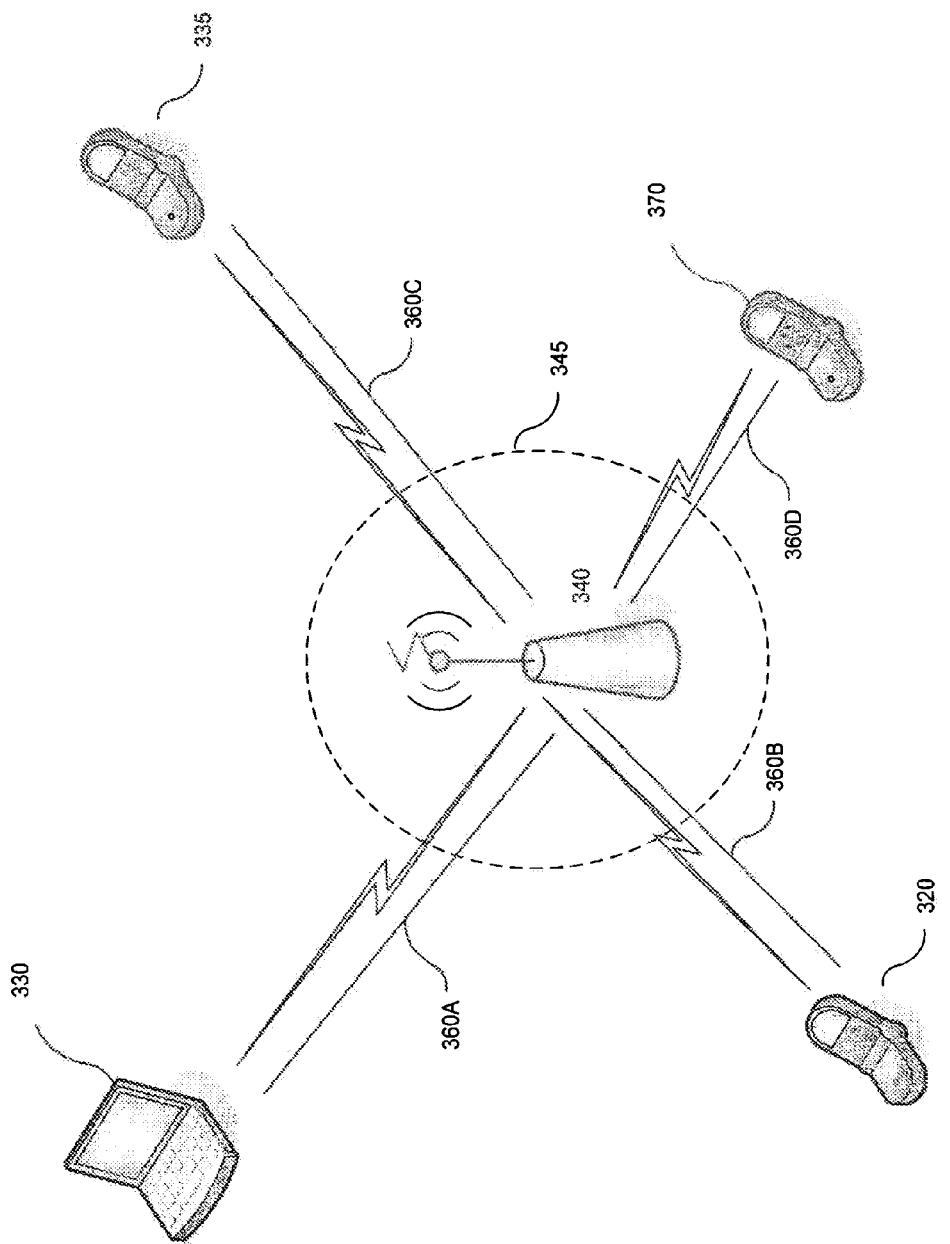
FIG. 3 is a diagram of a wireless access point and mobile devices, according to an embodiment.

FIG. 3 shows a more detailed example of a wireless access point without a pre-determined location. Wireless access point 340 is wirelessly coupled to mobile devices 320, 330, 335 and 370. Distances 360A-D represent the distances that respective mobile devices 320, 330, 335 and 370 are from wireless access point 340. Dotted line 345 represents the boundary of the estimated location for wireless access point 340.

As discussed further with the description of FIGS. 5-7 below, in an embodiment, distances 360A-D can be determined by using a location determined by a respective mobile device and a predetermined location of wireless access point 340 (using access point identifier for a lookup).

Figure 4:
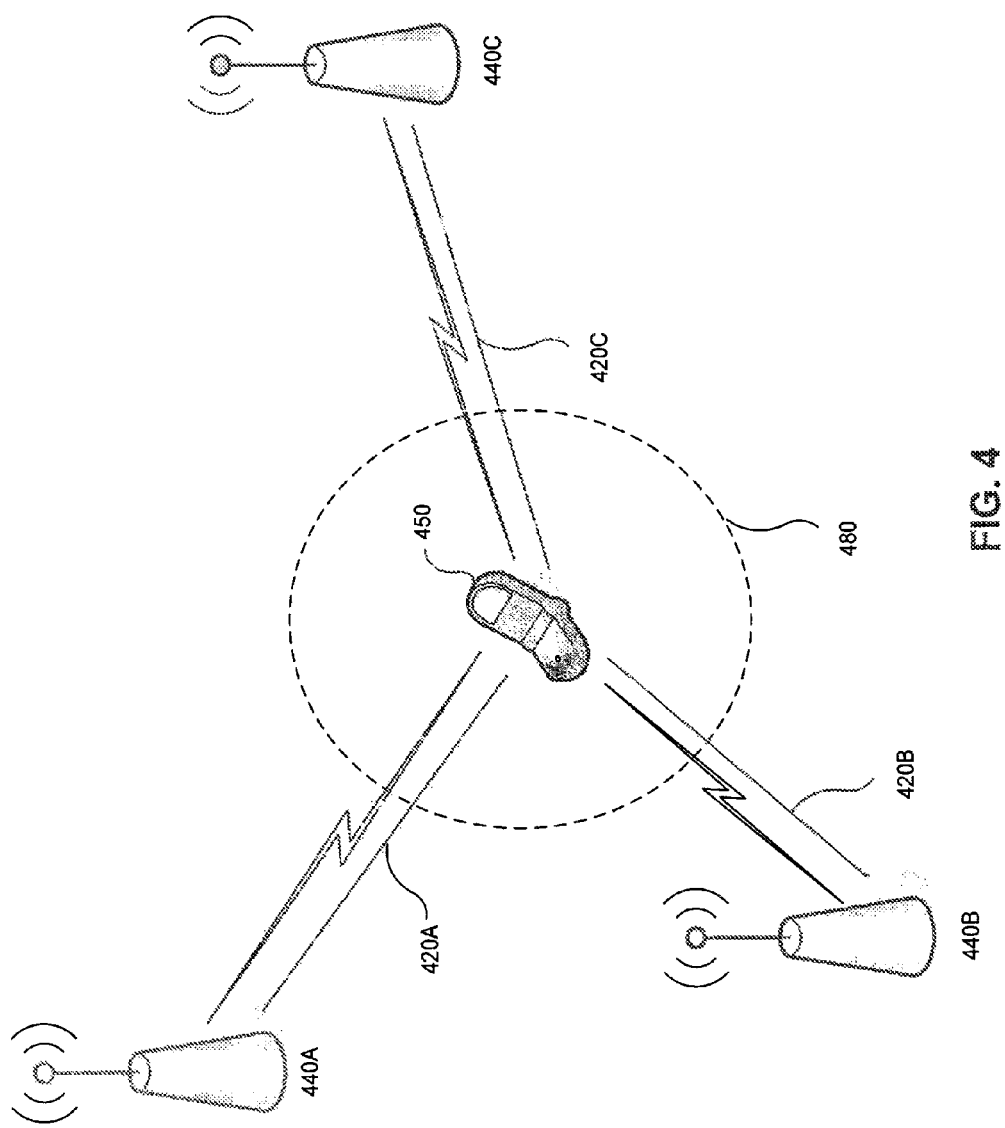
FIG. 4 is a diagram of wireless access points and a mobile device, according to an embodiment.

FIG. 4 shows a more detailed example of a mobile device without a known location. The signals generated by wireless access points 440A-C are wirelessly visible to mobile device 450 at respective distances 420A-C. Distances 420A-C represent the distance that respective wireless access points 440A-C are from mobile device 450.

Figure 5:
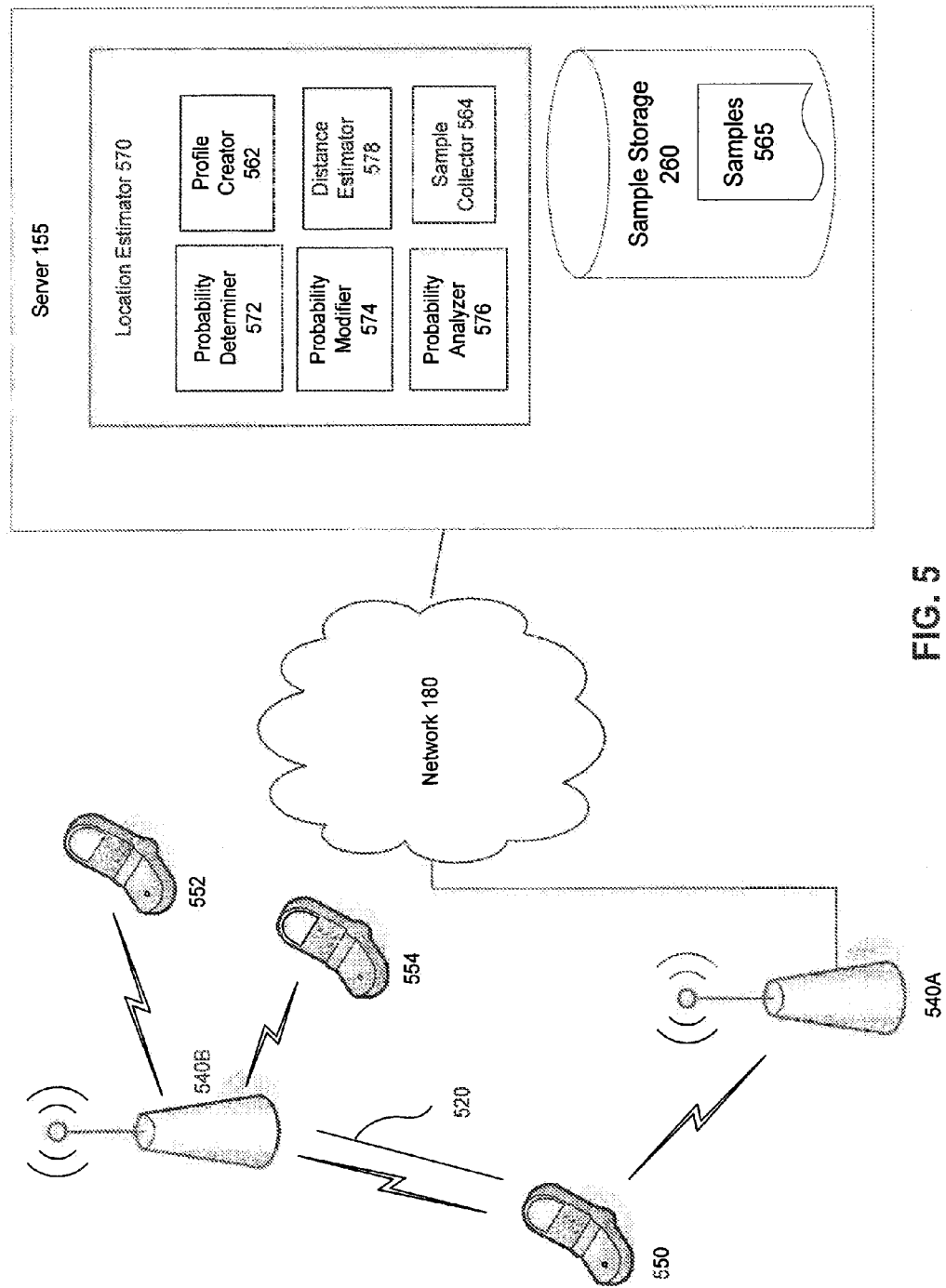
FIG. 5 is a detailed diagram of the components of a location estimator, according to an embodiment.

FIG. 5 shows wireless access points 540A-B, mobile devices 550, 552 and 554, network 180 and server 155. Server 155 includes location estimator 570 and sample storage 260. Location estimator 570 includes probability determiner 572, probability modifier 574, probability analyzer 576, profile creator 562, distance estimator 578 and sample collector 564. Sample storage 260 includes samples 565.

In one example illustrated using FIG. 5, the geographic location of wireless access point 540B is not known to operators of server 155. An embodiment provides a location estimator 570 configured to estimate the geographic location of access point 540B.

Before operation of the embodiment to estimate the location of wireless access point 540B, a plurality of samples are received by sample collector 564 from a plurality of sampled mobile devices, each sample including a mobile device location, an access point location, and a signal strength. Examples of samples received include samples from mobile devices 552 and 554. These samples can include a determined geographic location for each mobile device as well as a signal strength value of the signal received from wireless access point 340. Once received at server 155, these samples 565 are stored in sample storage 260 for use by location estimator 570.

Using samples 565 and information received from mobile device 550, probability determiner 572 is configured to determine a probability that access point 540B is a distance from mobile device 550. As described below, this determined probability is used in a probability distribution function. Information received from mobile device 550 includes a value corresponding to a measure of the signal strength of the signal received from wireless access point 540B. In this example, at least one of the samples 565 stored in sample storage 260 are associated with wireless access point 540B. By comparing the signal strength measured at mobile device 550 to the samples collected from mobile devices 552 and 554, an embodiment can determine a probability distribution function that mobile device 550 is a particular distance from wireless access point 540B. As the number of samples associated with wireless access point 540B increases, the accuracy of the determined probability distribution function increases.

Probability Matrices

Figure 6:
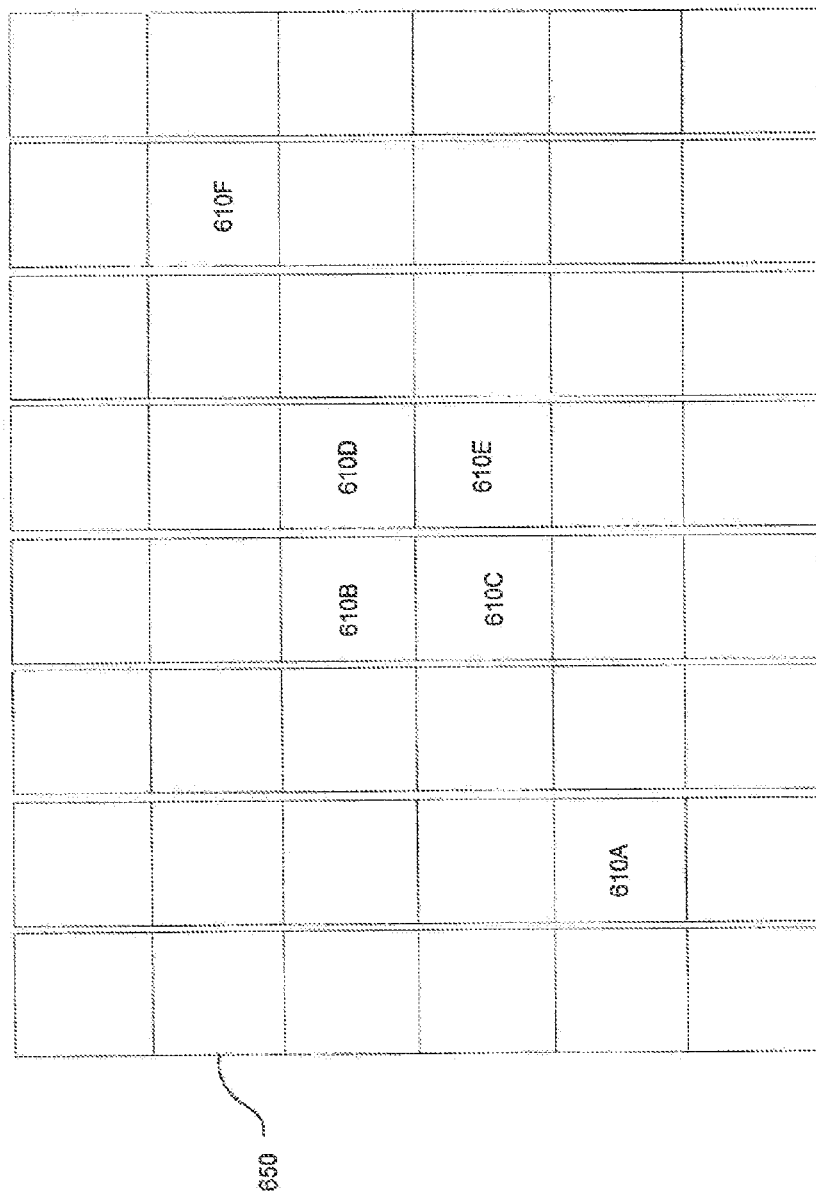
FIG. 6 is a diagram of a probability matrix used by an embodiment.

FIG. 6 shows a matrix that stores probability values for specific geographic locations associated with an access point. For example, all the matrix cells shown in matrix 650 (including labeled matrix cells 610A-F) correspond to a specific geographic location. In an embodiment, based on collected samples a probability value is assigned to each cell corresponding to the probability that a device (either and access point or mobile device, for example) are found at the geographic location. In this example, each cell represents (is mapped to) a 1×1 square meter of a geographic location. As would be appreciated by one having skill in the relevant art(s), different sizes can be used for matrix 650 cells. In the example discussed with FIG. 5 above, matrix 650 stores probability values associated with the location of mobile device 550.

In an embodiment, a method of estimating the location of a wireless access point includes stages S1-S13. As would be appreciated by one having skill in the relevant art(s), different stages may also be used to implement embodiments. Stages S1-S13 are listed below:

S1. A first sample is received from a first mobile device. This sample is associated with a wireless access point having an unknown location, or an imprecisely known location. The first sample includes a first mobile device location, preferably determined with a high level of accuracy, such as from a GPS determination. The sample also generally includes an access point identifier from the access point, e.g., a MAC address. This identifier can be used by an embodiment retrieve and store information associated with the access point. For example, when a location for the access point is estimated by an embodiment, this identifier can be used to retrieve the location. The first sample also includes a first value corresponding to a signal strength of a signal from the access point.

S2. Matrix 650 is created constructed with a size large enough to cover the rough estimate of the location of the access point. In an example, each cell in matrix 650 maps to 1×1 meter region. In an embodiment, a square matrix is used, although other embodiments can use different shapes, e.g., a rectangular matrix can be used.

S3. In one embodiment, a platform profile is selected that is associated with the first mobile device. This platform profile includes multiple probability distribution functions, each function corresponding to a signal strength. Given a distance, each probability function produces a probability that a signal source can be found at the distance. In another embodiment, a single profile is used for all devices.

S4. Based on the signal strength of the first sample, one of the multiple probability distribution functions associated with the selected profile is selected.

S5. A cell is selected in matrix 650 that corresponds to the received first mobile device location.

S6. Using the probability distribution function selected at stage S4, the cells of matrix 650 are populated with probabilities. One approach to performing this stage is to start at the cell selected at stage S5, and populate probabilities out in concentric circles using the selected probability distribution function.

S7. A second sample is received from a second mobile device. This sample is associated with the access point from stages S1-S7. The second sample includes a second mobile device location, preferably also determined with a high level of accuracy. The second sample also includes a second value corresponding to a signal strength of a signal from the access point.

S8. Based on the access point, matrix 650 is selected. Matrix 650 has the probability values stored based on stage S6 above.

S9. Similar to stage S3 above, in one embodiment, a platform profile is selected that is associated with the second mobile device. This platform profile also includes multiple probability distribution functions, each function corresponding to a signal strength.

S10. Based on the signal strength of the second sample, one of the multiple probability distribution functions associated with the selected profile is selected.

S11. A cell is selected in matrix 650 that corresponds to the received second mobile device location.

S12. Based on the probability distribution function selected at stage S10, the cells of matrix 650 are updated with probabilities. One approach to performing this stage is to start at the cell selected at stage S11, and update probabilities out in concentric circles using the selected probability distribution function. An embodiment uses Bayesian conditional probability and the multiplication rule to combine the probabilities in matrix cells. An example formula for updating cells is shown below:

$P$(Reading $R$)=the existing probability in cell($i,j$)

$P(AP$ in cell($i,j$))=the probability determined from the second sample $P$(Reading $R/AP$ in Cell($i,j$))=the probability of witnessing reading $R$, given the $AP$ in in Cell($i,j$). This is the updated value that is stored in matrix cell($i,j$)

S13. After the two samples are collected and used to update the probability values in the matrix the location of the access point can be estimated by different techniques. Different techniques for estimating the location of the access point from a populated probability matrix are discussed below with the description of FIG. 7B.

As would be appreciated by one having skill in the relevant art(s), stages S1-S13 described above can also be used to estimate the location of a mobile device. Instead of receiving a first and second sample from a first and second mobile device, a first and second sample are received from a single mobile device referencing a first and second wireless access point. In this example, the location of the mobile device is unknown, and the wireless access point locations are known to a high level of accuracy. A platform profile can also be used in this example, with a probability distribution function selected for each sample based on the signal strength of an access point at the mobile device and the mobile device platform.

In this example, a matrix is populated in updated based on samples associated with multiple access points, not mobile devices. After a number of samples, the populated matrix can be used to determine the location of the mobile device in an approach similar to the determination of the location an access point.

Figure 7A:
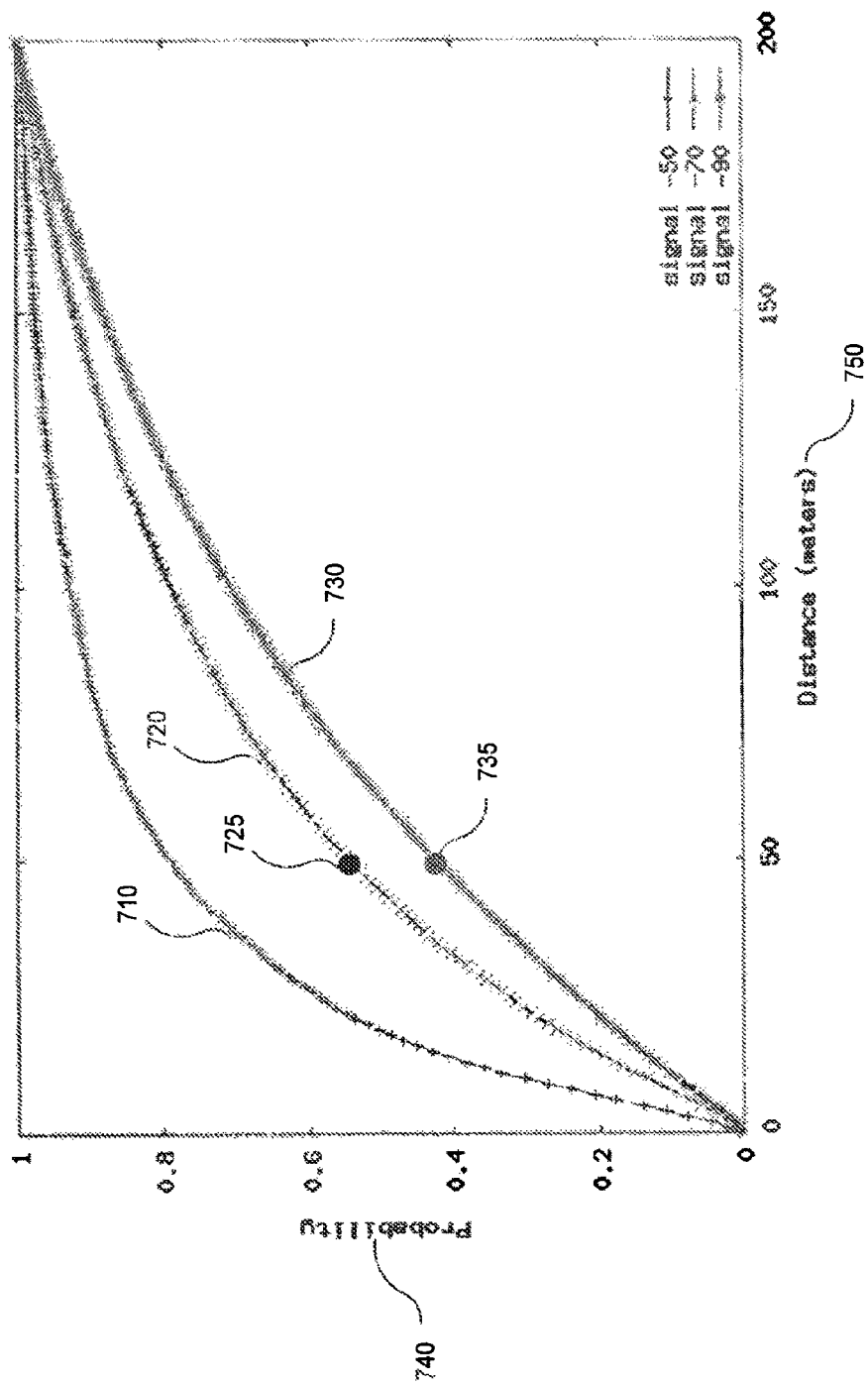
FIG. 7A is a chart showing the probability of a signal strength accurately indicating a distance measure, according to an embodiment.

FIG. 7A shows an example of three probability distribution functions. As described with FIG. 6 above, a probability distribution function is a chart depicting a relationship between determined probability 740 and distance 750 for a given signal strength. Each curve 710, 720 and 730 represents a different measured signal strength. Points 725 and 735 represent a probability 740 that the wireless signal source is at a particular distance 750, given a signal strength. Stages S3 and S9 above describe the use of a probability distribution function similar to the ones shown on FIG. 7A. FIG. 7A shows three functions, one function for each noted signal strength.

Figure 7B:
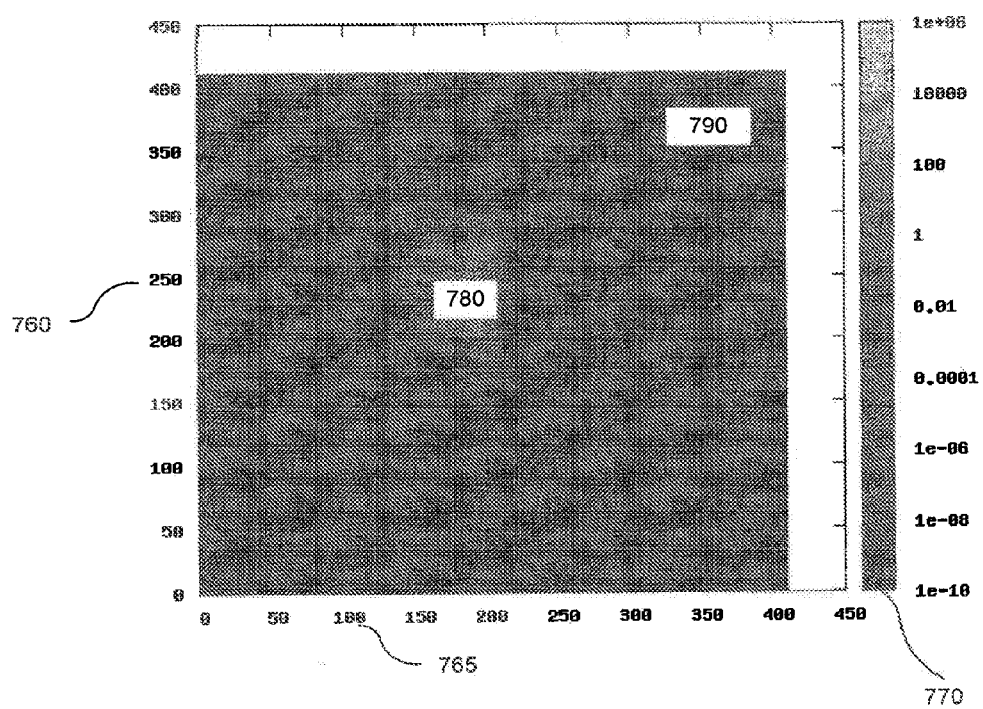
FIG. 7B is a heatmap of probabilities in a matrix mapped to geographic locations, according to an embodiment.

FIG. 7B shows a heatmap of probability values stored in a matrix by an embodiment, for example using the approach described in stages S1-S13 above. Matrix 790 is bounded by Y-Axis 760 and X-Axis 765. Label 770 shows a legend of probability values from the bottom (low) to the top (high). Point 780 shows an estimated location of a wireless access point based on a plurality of received samples. Generally speaking, after sufficient number of (stage S12) update iterations (for example, about 20), the probability values stored in matrix cells tends to converge spatially on matrix 790. An embodiment can compute the smallest circle that covers cells with a combined probability mass that reaches a certain target threshold. Another approach starts with the largest probability cell expands out to include cells in proximity until we reach a probability threshold. For example, in matrix 790, a small set of cells can have a probability of 0.9 on a 0-1 scale. An embodiment can expand out from that point to include all adjacent cells until the probability of cells drops below a threshold, for example .7.

As shown on FIG. 7B, certain matrix cells in close proximity to each other hold a majority of the probability mass. Point 780 shows this convergence of high probability in matrix 790. One threshold for minimum probability mass used by an embodiment is a probability of 0.7 on a 0-1 scale. Once this threshold has been exceeded by points in matrix 790, an estimation of the location of the wireless access point can be performed.

One approach to estimating the geographic location of an access point selects the center of the probability mass described above, e.g. point 780 in matrix 790.

Platform Profiles

Figure 8:
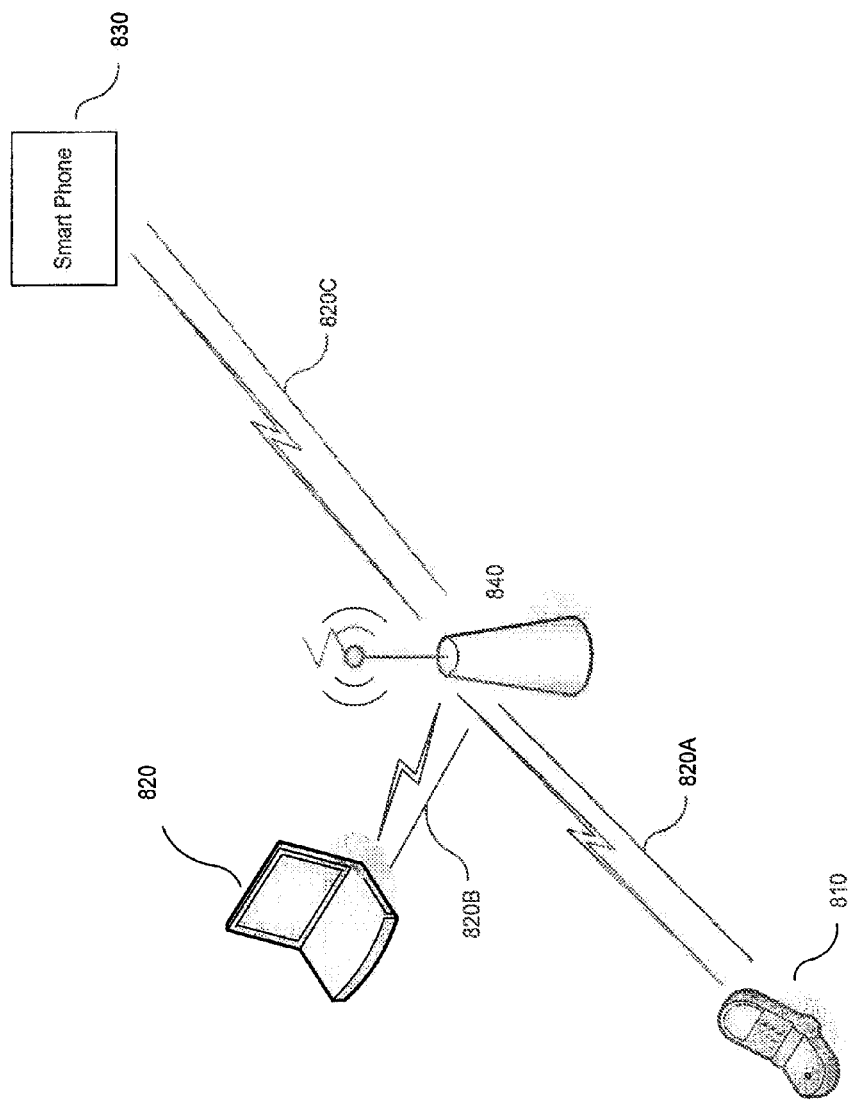
FIG. 8 is a diagram of a wireless access point and mobile devices, according to an embodiment.

FIG. 8 shows wireless access point 840 wirelessly coupled to mobile devices 810, 820 and 830 at respective distances 820A-C. The descriptions above of location estimates determined from mobile devices, access points and signal strengths do not differentiate between the types of mobile devices used. The types of mobile device sampled, e.g., smart phone 830, traditional mobile phone 810, netbook 820, tablet computer, can affect the measured strength of a signal from a wireless access point. Even given the same distance, signal strengths can vary significantly between types of devices. Similarly, different implementations of the above different types of mobile devices can also affect signal strengths. For example, a smartphone from company A may register a signal strength of −50 db from a distance, while a smartphone from company B may register a signal strength of −90 db (weaker) from the same distance.

In an embodiment, profile creator 562 is configured to use collected samples with a platform profile function to create a signal characteristic profile for different types and implementations of mobile devices. First, an embodiment uses the above estimating techniques to estimate the distance from a mobile device to an access point based on the signal strength from the wireless access point. In this example, accurate locations for the mobile device and the access point are known. Based on these known locations, an actual distance between the mobile device and the wireless access point is compared to the estimated distance. After multiple comparisons are made using the same mobile device platform, a platform profile is created that adjusts the estimated probability to account for differences between mobile devices.

As described above, in an embodiment a platform profile includes multiple probability distribution functions, each function corresponding to a signal strength. The platform profile creation technique described above allows the creation of multiple probability distribution functions, each based on a different signal strength. Given a distance, each probability function produces a probability that a signal source can be found at the distance. In another embodiment, a single profile is used for all devices. As would be appreciated by one having skill in the relevant art(s), profiles can be created to take many different signal modifying characteristics into account. Geographic areas, for example, are one signal modifying characteristic that can also be incorporated into profiles, as used herein.

The generated platform profile can be used as a probability adjustment value, performed by probability modifier 574. In some embodiments, this platform profile adjustment can increase the accuracy of location estimates generated by the determined probabilities.

Probability Calibration

In an embodiment, based on the received samples, the determined probability values stored in matrix 650 cells, updated by samples over multiple iterations, can tend to grow too large or become too small. In either case, because an embodiment stores the probability values as a double precision number, due to the limits of double precision numbers, precision in the stored probabilities could be lost. In one example, erroneously small points could cause certain cells to lose precision and essentially become "zero" for all subsequent GPS points. This loss of precision could affect the capability of an embodiment to "recover" from received erroneous data because these cells would never hold any significant amount of probability mass. Because these cells have an erroneously low probability, the estimated location of a wireless device could be erroneously moved away from these cells.

One approach used by an embodiment to address the above-noted loss of precision is to "re-calibrate" the stored probability values in matrix 650 after each iteration to keep them within reasonable limits. One approach to re-calibration can use three metrics associated with the probability values stored in matrix 650: the maximum probability value stored, the minimum probability stored and the sum total of all the probability values stored in matrix 650.

These three aggregate metrics can be determined by probability analyzer 576 and stored through the iterations of probability determination by probability determiner 572. Probability analyzer 576 can identify changes that can be made to prevent the average matrix 650 probability cell values, as given by the matrix sum, from exceeding or falling below threshold limits. Probability analyzer can also determine modifications that will keep the minimum matrix cell value from falling too close to a precision threshold. Based on the metrics determined by probability analyzer 576, probability modifier 574 can modify selected probability values stored in matrix 650. As would be appreciated by one having skill in the relevant art(s), different metrics and approaches can also be used to calibrate probability values.

Down Sampling

The example 400×400 matrix 790 discussed above can be difficult to manipulate by different devices. For example, while server 155 has sufficient computing capability to use matrix 790, performing manipulations using mobile device 550 could be more difficult.

In an embodiment, to facilitate manipulation of probability matrices, a sampled down version of a matrix is created from a larger matrix. For example, the 400×400 matrix 790 can be transformed into a 50×50 matrix by sampling. Over the smaller, sampled matrix we the same probability mass determinations performed above can be performed. Using a smaller matrix with embodiments can also reduce the amount of time required to generate results.

Method 900

Figure 9:
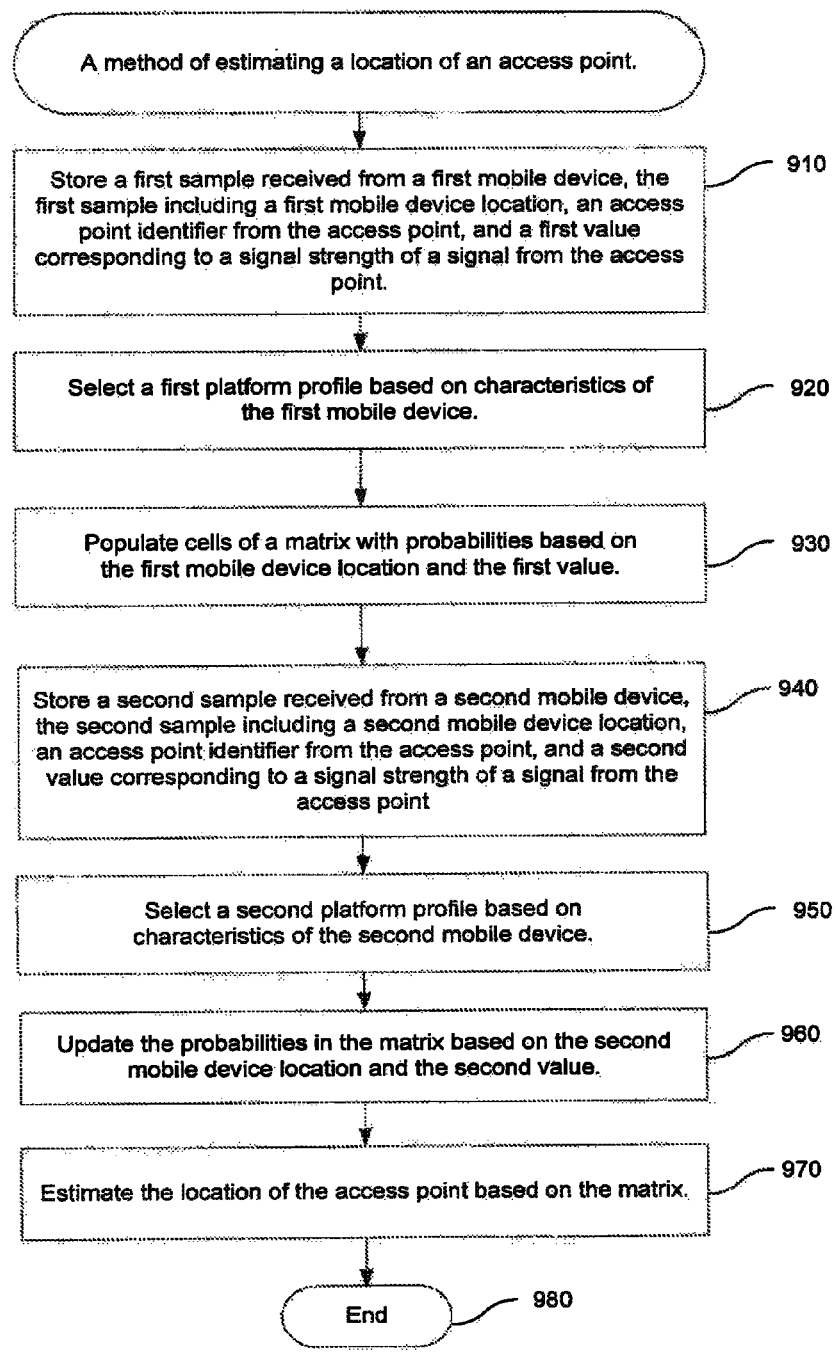
FIG. 9 is a diagram that shows a method for of estimating a location of a wireless access point, according to an embodiment.

FIG. 9 illustrates an exemplary method 900 of estimating a location of an access point. As shown in FIG. 9, method 900 begins at stage 910 where a first sample received from a first mobile device is stored, the first sample including a first mobile device location, an access point identifier from the access point, and a first value corresponding to a signal strength of a signal from the access point. In an embodiment, a first sample is received from a mobile device 550 and stored in sample storage 260, the first sample including a the location of mobile device 550, an access point identifier from access point 540B, and a first value corresponding to a signal strength of a signal from access point 540B. Once stage 910 is complete, method 900 proceeds to stage 920.

At stage 920, a first platform profile is selected based on characteristics of the first mobile device. In an embodiment, a first platform profile is selected based on characteristics of mobile device 555. Once stage 920 is complete, method 900 proceeds to stage 930.

At stage 930, the cells of a matrix are populated with probabilities based on the first mobile device location, the first platform profile and the first value. In an embodiment, the cells of matrix 650 are populated with probabilities based on the location of mobile device 550 and the first value. In the embodiment, the signal strength received is −50 db, and probability distribution function 710 is used to generate the probabilities stored in matrix 650. Once stage 930 is complete, method 900 proceeds to stage 940.

At stage 940, a second sample received from a second mobile device is stored, the second sample including a second mobile device location, an access point identifier from the access point, and a second value corresponding to a signal strength of a signal from the access point. In an embodiment, a second sample received from mobile device 552 is stored in sample storage 260, the second sample including the location of mobile device 552, an access point identifier from access point 540B, and a second value corresponding to a signal strength of a signal from access point 540B. Once stage 940 is complete, method 900 proceeds to stage 950.

At stage 950, a second platform profile is selected based on characteristics of the second mobile device. In an embodiment, a second platform profile is selected based on characteristics of mobile device 552. Once stage 950 is complete, method 900 proceeds to stage 960.

At stage 960, the probabilities in the matrix are updated based on the second mobile device location and the second value. In an embodiment, the probabilities in matrix 650 are updated based on the location of mobile device 552, the second platform profile and the signal strength measured from access point 540B (the second value). In the embodiment, the signal strength received is −70 db, and probability distribution function 720 is used to update the probabilities stored in matrix 650. Once stage 960 is complete, method 900 proceeds to stage 970.

At stage 970, the location of the access point is estimated based on the matrix.

In an embodiment, the location of access point 540B is estimated based on matrix 650. In the embodiment, FIG. 7B shows matrix 650 after multiple update iterations based on samples. Point 780 is an estimated location of access point 540B. After stage 970, method 900 ends at stage 980.

Example Computer System Implementation

Figure 10:
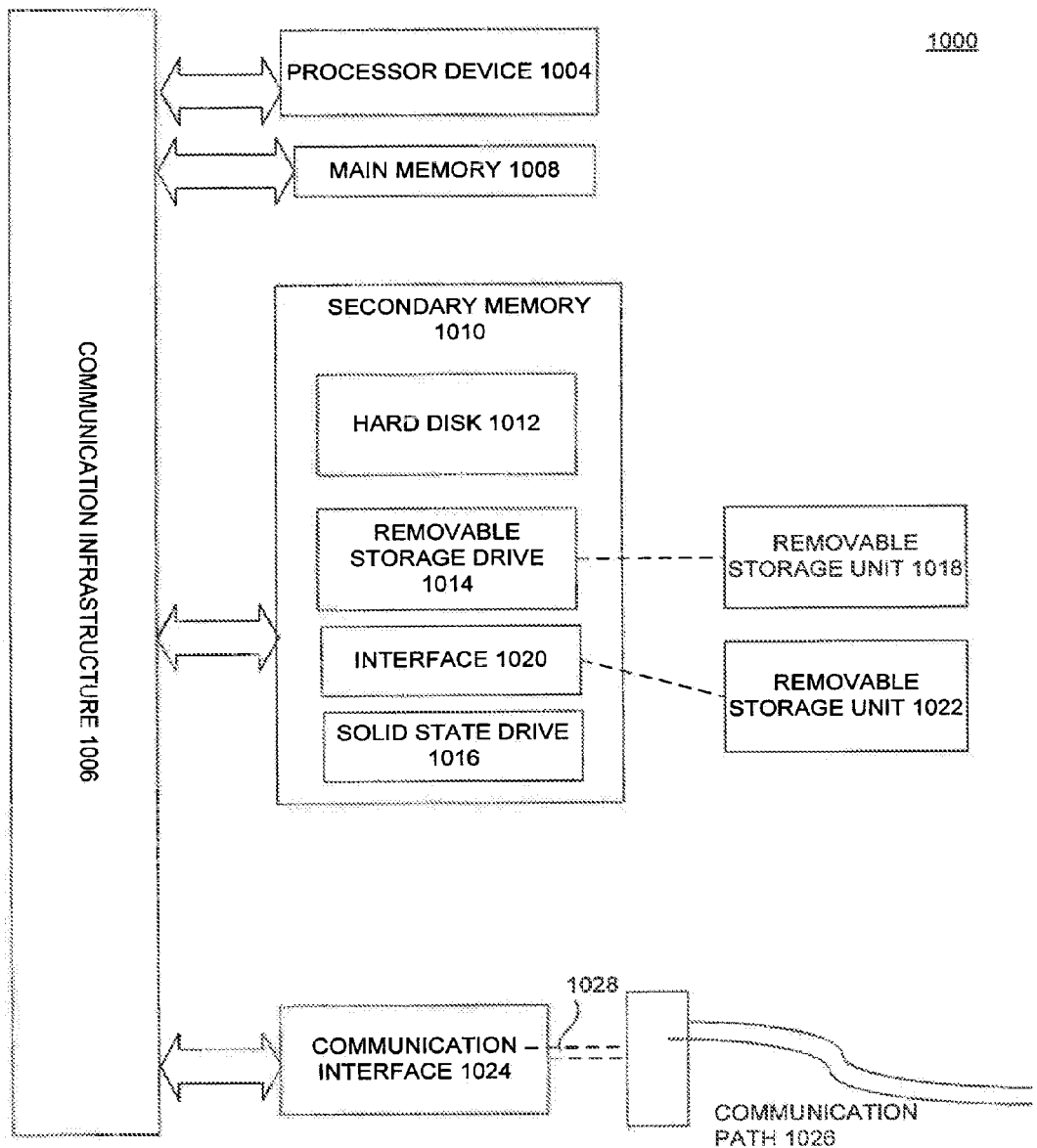
FIG. 10 depicts a sample computer system that may be used to implement an embodiment.

FIG. 10 illustrates an example computer system 1000 in which embodiments, or portions thereof, may be implemented as computer-readable code. For example, components of FIGS. 1-5 and 8, and stages of method 900 of FIG. 9 may be implemented in computer system 1000 using hardware, software, firmware, tangible computer readable media having instructions stored thereon, or a combination thereof and may be implemented in one or more computer systems or other processing systems. Hardware, software or any combination of such may embody any of the modules/components in FIGS. 1-5 and 8, and any stage in FIG. 9. Computer system 110 and server computer system 120 can also be implemented having components of computer system 1000.

If programmable logic is used, such logic may execute on a commercially available processing platform or a special purpose device. One of ordinary skill in the art may appreciate that embodiments of the disclosed subject matter can be practiced with various computer system and computer-implemented device configurations, including smartphones, cell phones, mobile phones, tablet PCs, multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor 'cores.'

Various embodiments are described in terms of this example computer system 1000. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 1004 may be a single processor in a multi-core/multiprocessor system, such system operating alone, or in a cluster of computing devices operating in a cluster or server farm. Processor device 1004 is connected to a communication infrastructure 1006, for example, a bus, message queue, network or multi-core message-passing scheme.

Computer system 1000 also includes a main memory 1008, for example, random access memory (RAM), and may also include a secondary memory 1010. Secondary memory 1010 may include, for example, a hard disk drive 1012, removable storage drive 1014 and solid state drive 1016. Removable storage drive 1014 may comprise a floppy disk drive, a magnetic tape drive, an optical disk drive, a flash memory, or the like. The removable storage drive 1014 reads from and/or writes to a removable storage unit 1018 in a well known manner. Removable storage unit 1018 may comprise a floppy disk, magnetic tape, optical disk, etc. which is read by and written to by removable storage drive 1014. As will be appreciated by persons skilled in the relevant art, removable storage unit 1018 includes a computer readable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 may be in electronic, electromagnetic, optical, or other forms capable of being received by communications interface 1024. This data may be provided to communications interface 1024 via a communications path 1026. Communications path 1026 carries the data and may be implemented using wire or cable, fiber optics, a phone line, a cellular phone link, an RF link or other communications channels.

In this document, the terms "computer program medium" and "computer readable medium" are used to generally refer to media such as removable storage unit 1018, removable storage unit 1022, and a hard disk installed in hard disk drive 1012. Computer program medium and computer readable medium may also refer to memories, such as main memory 1008 and secondary memory 1010, which may be memory semiconductors (e.g., DRAMs, etc.).

Computer programs (also called computer control logic) may be stored in main memory 1008 and/or secondary memory 1010. Computer programs may also be received via communications interface 1024. Such computer programs, when executed, enable computer system 1000 to implement embodiments as discussed herein. In particular, the computer programs, when executed, enable processor device 1004 to implement the processes of embodiments, such as the stages in the method illustrated by method 900 of FIG. 9 discussed above. Accordingly, such computer programs represent controllers of the computer system 1000. Where embodiments are implemented using software, the software may be stored in a computer program product and loaded into computer system 1000 using removable storage drive 1014, interface 1020, hard disk drive 1012 or communications interface 1024.

Embodiments also may be directed to computer program products comprising software stored on any computer useable medium. Such software, when executed in one or more data processing devices, causes a data processing device(s) to operate as described herein. Embodiments can employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

Conclusion

Embodiments described herein relate to methods, system and computer program products for estimating a location of a wireless access point. The summary and abstract sections may set forth one or more but not all exemplary embodiments contemplated by the inventors, and thus, are not intended to limit the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature embodiments that others may, by applying knowledge within the skill of the art, readily modify and/or adapt for various applications such specific embodiments, without undue experimentation, without departing from the general concepts discussed herein. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments should not be limited by any of the above-described exemplary embodiments, but should be defined only in accordance with the claims and their equivalents.

What is claimed is:

1. A method of estimating a location of a wireless access point, comprising:
    storing a first sample received from a first mobile device, the first sample including a first mobile device location, an access point identifier from the wireless access point, and a first value corresponding to a signal strength of a signal from the wireless access point;
    selecting a first platform profile based on characteristics of the first mobile device;
    populating cells of a matrix with probabilities based on the first mobile device location, the first platform profile and the first value;
    storing a second sample received from a second mobile device, the second sample including a second mobile device location, an access point identifier from the wireless access point, and a second value corresponding to a signal strength of a signal from the wireless access point;
    selecting a second platform profile based on characteristics of the second mobile device;
    updating the probabilities in the matrix based on the second mobile device location, the second platform profile and the second value; and
    estimating the location of the wireless access point based on the matrix.

2. The method of claim 1, wherein selecting the first platform profile based on characteristics of the first mobile device comprises selecting a platform profile that includes multiple probability distribution functions, each function corresponding to a different signal strength and the first mobile device.

3. The method of claim 2, wherein selecting the first platform profile comprises selecting a platform profile that includes multiple probability distribution functions, wherein each probability function produces a probability that a signal source measured by the first mobile device can be found at a distance.

4. The method of claim 1, wherein estimating the location of the wireless access point comprises estimating the location of the wireless access point based on at least two determined probabilities, each probability associated with a different mobile device.

5. The method of claim 4, further comprising for at least two probabilities in the matrix:
    analyzing the at least two probabilities; and
    modifying each of the at least two probabilities based on the analyzing of the probabilities.

6. The method of claim 5, wherein analyzing the probabilities comprises, for each probability, determining a minimum probability, a maximum probability and a sum of the at least two probabilities.

7. The method of claim 1, further comprising for a sample, determining a location for another wireless access point based on an access point identifier; and estimating a distance value for the stored first sample based on the determined another access point location and the first mobile device location value of the sample.

8. The method of claim 1, wherein storing a plurality of samples received from a plurality of sampled mobile devices comprises storing a sample that includes a mobile device location determined by using a global positioning system determination.

9. The method of claim 1, wherein storing a plurality of samples received from a plurality of sampled mobile devices comprises storing a sample that includes a mobile device location determined by using a known access point location.

10. The method of claim 1, further comprising determining the first platform profile based on the stored samples associated with the first mobile device.

11. The method of claim 10, wherein determining the first platform profile based on the stored samples comprises determining a platform profile that uses the stored samples to model a signal strength characteristic of the first mobile device.

12. A location estimator, comprising:
    a sample collector configured to store a plurality of samples received from a plurality of sampled mobile devices, each sample including a mobile device location, an access point location, and a signal strength; and
    a probability determiner configured to determine a probability that a mobile device is a distance from an access point based on
    a value corresponding to the signal strength of the signal received at the mobile device from the access point,
    a stored sample, wherein the access point is associated with the stored sample, and
    a first platform profile based on a signal characteristic of the type and implementation of the mobile device,
    wherein the location estimator is configured to estimate the location of the mobile device based on the probability.

13. The location estimator of claim 12, wherein the location estimator is configured to estimate location based on at least two determined probabilities, each probability being:
    determined by the probability determiner, and
    associated with a different access point.

14. The location estimator of claim 13, further comprising
    a probability analyzer configured to analyze the at least two determined probabilities; and
    a probability modifier configured to modify each of the at least two determined probabilities based on the analyzing of the probabilities.

15. The location estimator of claim 14, wherein analyzing, by the probability analyzer, of the probabilities comprises, determining a minimum probability, a maximum probability and a sum of the at least two probabilities.

16. The location estimator of claim 12, further comprising a distance estimator configured to estimate a distance for a stored sample based on the access point location and the mobile device location values of the sample.

17. The location estimator of claim 12, wherein the sample collector is configured to store a sample having a mobile device location determined by using a global positioning system determination.

18. A non-transitory computer readable storage medium having computer-executable instructions stored thereon that, when executed by a computing device, cause the computing device to perform a method of estimating a location of a mobile device, the method comprising:
- storing a first sample received from a first mobile device, the first sample including a first mobile device location, an access point identifier from the wireless access point, and a first value corresponding to a signal strength of a signal from the wireless access point;
- selecting a first platform profile based on characteristics of the first mobile device;
- populating cells of a matrix with probabilities based on the first mobile device location, the first platform profile and the first value;
- storing a second sample received from a second mobile device, the second sample including a second mobile device location, an access point identifier from the wireless access point, and a second value corresponding to a signal strength of a signal from the wireless access point;
- selecting a second platform profile based on characteristics of the second mobile device;
- updating the probabilities in the matrix based on the second mobile device location, the second platform profile and the second value; and
- estimating the location of the wireless access point based on the matrix.

* * * * *